US006850471B1

(12) United States Patent
Black et al.

(10) Patent No.: US 6,850,471 B1
(45) Date of Patent: Feb. 1, 2005

(54) ELECTRICAL DEVICE

(75) Inventors: Karl-Heinz Black, Hildesheim (DE); Guenter Schuchardt, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,647

(22) PCT Filed: Mar. 11, 1999

(86) PCT No.: PCT/DE99/00667

§ 371 (c)(1),
(2), (4) Date: Dec. 19, 2000

(87) PCT Pub. No.: WO99/52089

PCT Pub. Date: Oct. 14, 1999

(30) Foreign Application Priority Data

Apr. 3, 1998 (DE) ........................................ 198 15 015

(51) Int. Cl.$^7$ .................................................. G11B 7/00
(52) U.S. Cl. .................................................... 369/53.11
(58) Field of Search ........................... 369/53.21, 53.11, 369/53.37

(56) References Cited

U.S. PATENT DOCUMENTS 5,220,549 A * 6/1993 Yanagidate .............. 369/53.21
6,118,744 A * 9/2000 Sturgeon et al. ......... 369/53.21

FOREIGN PATENT DOCUMENTS

EP 0 525 895 2/1993
WO WO 94/04972 3/1994

* cited by examiner

*Primary Examiner*—Nabil Hindi
(74) *Attorney, Agent, or Firm*—Kenyon & Kenyon

(57) ABSTRACT

An electrical device, in particular a car radio, allows more user-friendly checking of access authorization is described. The electrical device includes a disc drive for a storage medium, a read device being provided for reading data stored on the storage medium placed in the disc drive. Device-specific data is stored in a memory assigned to the electrical device. Data read from the storage medium is compared with the device-specific data. The electrical device is only rendered operational if the data that has been read matches the device-specific data.

19 Claims, 2 Drawing Sheets

ELECTRICAL DEVICE

FIELD OF THE INVENTION

The present invention relates to an electrical device.

BACKGROUND INFORMATION

The car radio Kiel RD 126, which has a compact disc drive, is described in the Blaupunkt catalog *Programm* '96/'97 *Sound und Fahrvergnugen pur. Mobile Kommunikation von Blaupunkt* ['96-'97 Program: Pure Sound and Driving Pleasure. Mobile Communications from Blaupunkt]. This car radio also has an insertion slot for an access authorization card having an electronic memory chip in phone card format. An access code is stored on the memory chip. Herein, the insertion slot is not embodied as a disc drive.

SUMMARY

The electrical device according to the present invention has the following advantages: Device-specific data is stored in a memory assigned to the electrical device; data read from the storage medium is compared with the device-specific data; and the electrical device is only rendered operational if the data that has been read matches the device-specific data. Thus, there is no need for an insertion slot for an access authorization card, and a storage medium for checking access authorization can be introduced into a disc drive that is already provided. This saves space on the electrical device's control panel and at the same time gives the user a better overview and improved ease of operation, as there is only one way to insert external storage means via the electrical device's control panel. As there is no separate insertion slot for an access authorization card, one can reduce expenditures on manufacturing the electrical device and thus reduce the associated costs.

It is particularly useful that, after a predefined time period has elapsed, the electrical device is only rendered operational if the storage medium is inserted into the disc drive, and upon comparison it is determined that the data read from the storage medium matches the device-specific data. Thus, the user does not constantly have to bring the storage medium with him and insert it in the disc drive each time he wishes to render the device operational.

A further advantage is that this time period can be predefined via an input unit of the electrical device. Thus, the user can tailor the efficacy of the theft protection achieved via the access authorization data of the storage medium to his ease of operation needs when switching on the electrical device. A further advantage is that, after the power supply has been interrupted, the electrical device is only rendered operational if a storage medium is inserted into the disc drive and upon comparison it is determined that the data read from the storage medium matches the device-specific data. This means one can achieve theft protection if the power supply to the electrical device is interrupted as a result of a theft. Thus, the electrical device is useless to a thief who is not in possession of the storage medium.

A further advantage is that with the use of the device-specific data, an operating instruction routine that matches the electrical device model and is stored on the storage medium can be read by the read device and processed by an open-loop control system of the electrical device so that information regarding. The use of the electrical device's functions can be reproduced on a reproduction device. This increases the ease of use to the user, who can be given information about the use of the electrical device along with the access authorization. Thus, there is no need for a separate instruction manual for the electrical device, which means complexity, material and costs can be reduced.

A further advantage is that the functions that are reproduced are activated. Thus, is it possible to provide an interactive explanation of the use of the electrical device via the reproduction device, so that at the same time the user can practice use thereof.

DETAILED DESCRIPTION

Figure 1:
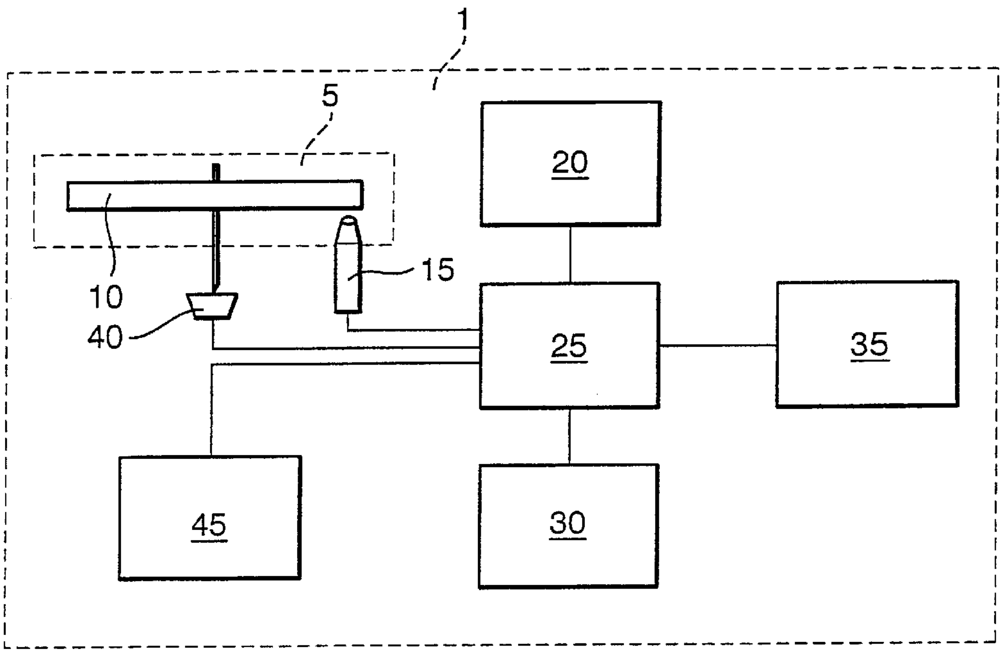
FIG. 1 is a schematic view of an electrical device according to the present invention.

In FIG. 1, an electrical device 1 is embodied as a car radio. However, electrical device 1 may also be any other electrical device, for example a television set, a video recorder, a washing machine, a PC, or the like which only an authorized person or group of authorized people are to be granted access. Car radio 1 includes disc drive 5 for storage medium 10, which is may be, for example, an optical storage disc, such as a compact disc or mini-disc. However, disc drive 5 may be for a magnetic storage medium 10, e.g., a PC diskette. In this exemplary embodiment, disc drive 5 shown in FIG. 1 is a compact disc drive. Thus, in this exemplary embodiment, storage medium 10 is embodied as a compact disc. Compact disc 10 is rotationally driven by motor 40 and scanned by read device 15, which reads data stored on compact disc 10 and sends the data to open-loop control system 25. Memory 20, input unit 35 and reproduction device 30 are connected to open-loop control system 25. Reproduction device 30 may be an optical and/or acoustic reproduction device that includes a display device and/or at least one loudspeaker. In the present exemplary embodiment, reproduction device 30 is embodied as a display device. Open-loop control system 25 also controls function 45 of car radio 1. Open-loop control system 25 also controls motor 40.

Device-specific data of car radio 1 are stored in memory 20. Memory 20 may be located outside car radio 1. Input unit 35, display device 30 and disc drive 5 may be located outside car radio 1.

In open-loop control system 25, the data read from compact disc 10 is compared with the device-specific data stored in memory 20. If as a result of this comparison it is determined that the data that has been read matches the device-specific data, positive access authorization is granted, and, as a result, open-loop control system 25 renders car radio 1 operational. However, car radio 1 is only rendered operational if the data that has been read matches the device-specific data. If it does not, car radio 1 is not rendered operational by open-loop control system 25. Thus, theft protection can be achieved, as car radio 1 can only be rendered operational by a person who is also in possession of the corresponding compact disc 10.

It is also possible, for example, that after it has been purchased, car radio 1 is only rendered operational for the first time if compact disc 10 is placed in disc drive 5 and, upon comparison, it is determined that the data read from compact disc 10 matches the device-specific data.

It is also possible to achieve effective theft protection if, after the supply voltage of car radio 1 has been interrupted, car radio 1 is only rendered operational if compact disc 10 is placed in disc drive 5 and, upon comparison, it is determined that the data read from compact disc 10 matches the device-specific data. If the car radio is stolen, the supply voltage is interrupted, Thus, one can achieve theft protection because the thief cannot render car radio 1 operational without compact disc 10 so that car radio 1 is useless to the thief.

Car radio 1 would not be easy to use if the user had to insert compact disc 10 in disc drive 5 every time he wanted to render car radio 1 operational; Therefore it is possible to arrange that after a predefined time period has elapsed, car radio 1 is only rendered operational if compact disc 10 is placed in disc drive 5 and, upon comparison, it is determined that the data read from compact disc 10 matches the device-specific data. Thus, until the predefined time period has elapsed, the user can render car radio 1 operational without placing compact disc 10 in disc drive 5, Thus, it is easier for the user to render car radio 1 operational. After the predefined time period has elapsed, provided the user has placed compact disc 10 having the data that renders car radio 1 operational in disc drive 5, it is not necessary to once again place compact disc 10 in disc drive 5 until the predefined time period has elapsed again, this predefined time period starting, for example, as soon as it has been determined that the data read from compact disc 10 matches the device-specific data.

Furthermore, the user may predefine this time period himself via input unit 35 and may reach a compromise between the efficacy of theft protection and ease of use when switching on car radio 1, depending on his needs.

Furthermore, with the help of the device-specific data stored in memory 20 an operating instructions routine which matches the model of car radio 1 and is stored on compact disc 10 can be read by read device 15 and processed by open-loop control system 25 of car radio 1 so that information regarding the use of functions 45 of car radio 1 can be displayed on display device 30. This information can, for example, be displayed on display device 30 using ticker-tape text. In addition, it is possible for functions 45 of car radio 1 assigned to the information displayed on display device 30 to be activated so that the instructions can be displayed on display device in an interactive manner and so that the user can operate functions 45 that are displayed by making appropriate entries via input unit 35 and thus practice them.

After rendering the device operational, the user may place other compact discs in disc drive 5, for example, in order to play music.

Operating instruction routines for a plurality of models may be stored in read-only memory on compact disc 10. Due to the device-specific data being, stored in memory 20, the user only has access to the instructions that match the model of car radio 1. It is also possible to print out the instructions stored on compact disc 10 using a printer connected to a PC if compact disc 10 is placed in the PC's disc drive. The operating instructions may also be stored on compact disc 10 in various languages, it being possible to select the desired language in which the information is to be displayed via display device 30 on car radio 1. One can also select a specific language on the PC so that the instructions printed out via the printer are printed out in the selected language.

Further identification data regarding car radio 1 may be printed directly on compact disc 10 or printed on an adhesive label attached to compact disc 10.

Figure 2:
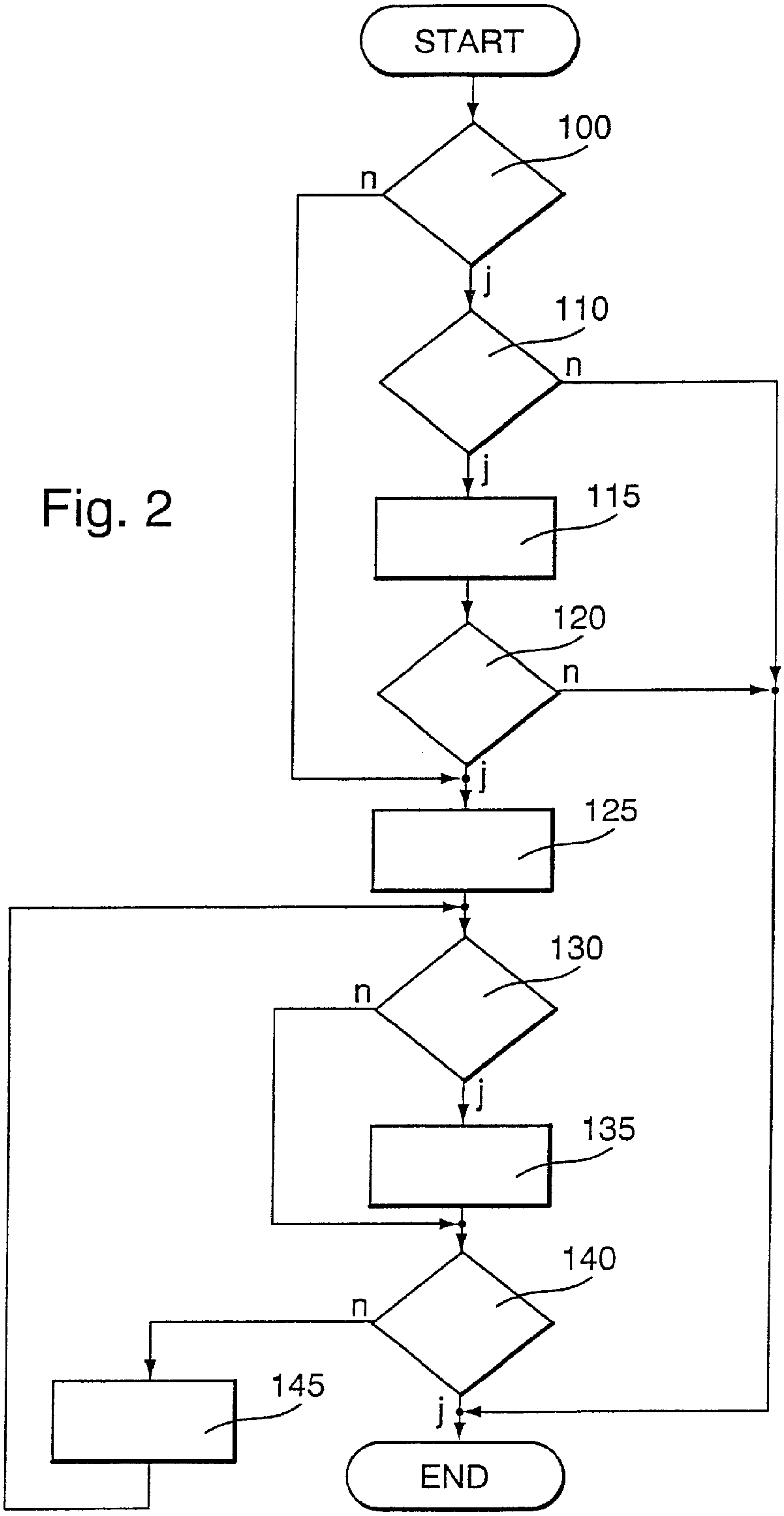
FIG. 2 is a flow chart illustrating the function of an open-loop control system of the electrical device.

FIG. 2 shows a flow chart indicating the functioning of open-loop control system 25. When car radio is switched on, the sequence of operations illustrated in the flow chart shown in FIG. 2 begins. At program point 100, open-loop control system 25 checks whether the predefined time period has elapsed, whether the supply voltage of car radio 1 has been interrupted or whether car radio is being rendered operational for the first time following purchase. If so, processing branches to program point 110; Otherwise, processing branches to program point 125. The predefined time period may also be set to 0, which means in every instance, i.e., every time car radio is switched on, processing branches from program point 100 to program point 110. At program point 110, open-loop control system 25 checks whether compact disc 10 has been placed in disc drive 5. If so, processing branches to program point 115; If not, processing quits this part of the program. At program point 115, open-loop control system 25 causes read device 15 to read data from compact disc 10. A specific section of compact disc 10, in which access authorization data for rendering car radio 1 operational is stored, may be addressed. The data read is sent by read device 15 to open-loop control system 25. At program point 120, open-loop control system 25 checks whether the access authorization data of compact disc 10 that has been read matches the device-specific data stored in memory 20. If so, processing branches to program point 125; If not, processing quits this part of the program. At program point 125, open-loop control system 25 causes car radio 1 to be rendered operational, as it has determined that the compact disc 10 that has been placed in disc drive 5 contains valid access authorization data. Next, processing branches to program point 130. At program point 130, open-loop control system 25 checks whether instructions have been requested via input unit 35 and whether a compact disc 10 containing an operating instructions routine for the model of car radio 1 has been placed in disc drive 5. To accomplish this, open-loop control system 25 compares the device-specific data stored in memory 20 with corresponding identification data which read device 15, which is controlled via open-loop control system 25, has read from a section of compact disc 10 that has been addressed in order to obtain the instructions routine. If this identification data matches the device-specific data stored in memory 20, processing branches to program point 135; Otherwise, processing branches to program point 140. At program point 135, open-loop control system 25 causes display device 30 to display information regarding the equation of functions 45 of car radio 1, e.g., using ticker-tape text. Functions 45 displayed via display device 30 can simultaneously be activated by open-loop control system 25 so that the user can interactively operate the functions 45 displayed and described when the operating instructions are displayed via display device 30 and can thus practice the use of car radio 1. After program point 135, processing branches to program point 140. At program point 140, open-loop control system 25 checks whether car radio 1 has been switched off via input unit 35. If so, processing quits this part of the program; Otherwise, processing branches to program point 145. At program point 145, functions 45 of car radio 1 are operated by the user via input unit 35. After a further predefined time period, processing branches back from program point 145 to program point 130, and open-loop control system 25 once again checks whether instructions have been requested via input unit 35 and whether an appropriate compact disc 10 has been placed in disc drive 5.

What is claimed is:

1. An electrical device, comprising:

a disc drive;

a read device configured to read data stored on a storage medium placed in the disc drive;

a memory configured to store device-specific data, the device specific data specific to the electrical device, the device-specific data corresponding to at least a model of the electrical device; and a control system configured to compare data read from the storage medium with the device-specific data;

wherein the control system renders the electrical device operational only if the data read from the storage medium matches the device-specific data.

2. The electrical device according to claim 1, wherein the electrical device is a car radio.

3. The electrical device according to claim 1, wherein the disc drive is configured to read an optical storage disc.

4. The electrical device according to claim 1, wherein the disc drive is configured to read a magnetic storage medium.

5. The electrical device according to claim 1, wherein after a predefined time period has elapsed, the control system renders the electrical device operational only if a storage medium is placed in the disc drive and the control system determines that, based on the comparison, data read from the storage medium matches the device-specific data.

6. The electrical device according to claim 1, wherein the control system renders the electrical device operational for a first time only if a storage medium is placed in the disc drive and the control system determines that, based on the comparison, data read from the storage medium matches the device-specific data.

7. The electrical device according to claim 1, wherein the control system renders the electrical device operational after a supply voltage interruption only if a storage medium is placed in the disc drive and the control system determines that, based on the comparison, data read from the storage medium matches the device-specific data.

8. The electrical device according to claim 1, further comprising:

a reproduction device, the control system controlling the reproduction device to reproduce information relating to use of functions of the electrical device, the read device configured to read an operating instruction routine from the storage medium in accordance with the device-specific data and corresponding to a model of the electrical device.

9. The electrical device according to claim 8, wherein the functions reproduced are activatable.

10. The electrical device according to claim 5, further comprising:

an input unit, the time period being predefinable via the input unit.

11. The device according to claim 1, wherein the electrical device is one of a television set, a video recorder, and a personal computer.

12. The device according to claim 1, wherein the disc drive is configured to read a mini-disc.

13. The device according to claim 1, wherein the device is configured not to require a separate insertion slot for an access authorization card.

14. A method for checking access authorization for an electrical device without requiring an insertion slot for an access authorization card, comprising:

placing a storage medium in a disc drive of the electrical device;

reading data stored on the storage medium;

comparing data read from the storage medium with device-specific data stored in a memory of the electrical device that corresponds to at least a model of the electrical device; and rendering the electrical device operation only if the data read from the storage medium matches the device-specific data.

15. A method of ensuring access authorization to an electrical device without requiring an insertion slot for an access authorization card, comprising:

assigning device-specific data to the electrical device;

configuring a memory of the electrical device to store the device-specific data that corresponds to at least a model of the electrical device; and configuring a control system of the electrical device to render the electrical device operational only if data read from a storage medium placed in a disc drive of the electrical device matches the device-specific data.

16. The electrical device according to claim 1, wherein the electrical device includes means for performing a method for checking access authorization without requiring an insertion slot for an access authorization card, the method including:

placing the storage medium in the disc drive of the electrical device;

reading data stored on the storage medium;

comparing data read from the storage medium with device-specific data stored in the memory of the electrical device that corresponds to at least a model of the electrical device; and rendering the electrical device operational only if the data read from the storage medium matches the device specific-data.

17. The electrical device according to claim 1, wherein the electrical device includes means for performing a method of ensuring access authorization to the electrical device without requiring an insertion slot for an access authorization card, the method including:

assigning device-specific data to the electrical device;

configuring a memory of the electrical device to store the device-specific data that corresponds to at least a model of the electrical device; and configuring a control system of the electrical device to render the electrical device operational only if data read from a storage medium placed in a disc drive of the electrical device matches the device-specific data.

18. The electrical device of claim 1, wherein the device-specific data uniquely identifies the electrical device.

19. An electrical device, comprising:

a disc drive;

a read device configured to read data stored on a storage medium placed in the disc drive;

a memory configured to store device-specific data, the device specific data specific to the electrical device, the device-specific data corresponding to at least a model of a specific electrical device; and a control system configured to compare data read from the storage medium with the device-specific data;

wherein the control system renders the electrical device operational only if the data read from the storage medium matches the device-specific data.

* * * * *

UNITED STATES PATENT AND TRADEMARK OFFICE

CERTIFICATE OF CORRECTION

PATENT NO. : 6,850,471 B1
APPLICATION NO. : 09/647647
DATED : February 1, 2005
INVENTOR(S) : Black et al.

It is certified that error appears in the above-identified patent and that said Letters Patent is hereby corrected as shown below:

On the Title of the patent item #(57), under the heading “Abstract”, line 1, change “radio, allows more” to --radio, that allows more--

Column 2, line 22, change “or the like which” to --or the like to which--

Column 2, line 25, change “which is may be” to --which may be--

Column 3, line 11, change “radio 1 operational; Therefore” to --radio 1 operational. Therefore--

Column 4, line 7, change “point 110; Otherwise,” to --point 110. Otherwise--

Signed and Sealed this

Twenty-second Day of January, 2008

JON W. DUDAS
*Director of the United States Patent and Trademark Office*